United States Patent [15] 3,654,554
Cook [45] Apr. 4, 1972

[54] SECURE PULSE COMPRESSION CODING SYSTEM
[72] Inventor: Charles E. Cook, Farmingdale, N.Y.
[73] Assignee: Sperry Rand Corporation, Great Neck, N.Y.
[22] Filed: Jan. 29, 1963
[21] Appl. No.: 255,718

[52] U.S. Cl. ............................... 325/43, 325/32, 343/6.5 R, 343/6.8 R
[51] Int. Cl. ......................................................... H04b 1/66
[58] Field of Search .............. 325/32, 35, 125, 143; 343/6.5, 343/6.8

[56] References Cited

UNITED STATES PATENTS 3,202,764  8/1965  Adams et al. ..................... 179/1.5 S Primary Examiner—Malcolm F. Hubler
Assistant Examiner—N. Moskowitz
Attorney—Samuel C. Yeaton

[57] ABSTRACT

A pulse compression coding system comprising a transmitter providing first and second frequency swept signals of coextensive range and opposite sweep sense, each angle modulated in accordance with the amplitude and frequency of respective sinusoidal modulating signals for producing various carrier and sideband components, and a receiver including pulse compression filter means connected to the output of first and second mixers which respectively retain and invert the sweep sense of the received angle modulated signals whereby a pulse representative of each angle modulated component of the frequency swept signals is provided at the output of the filter means.

13 Claims, 4 Drawing Figures

INVENTOR.
CHARLES E. COOK
BY Robert J. Haare
ATTORNEY

INVENTOR.
CHARLES E. COOK
BY
ATTORNEY

SECURE PULSE COMPRESSION CODING SYSTEM

The present invention generally relates to pulse coding communication systems and, more particularly, to a system of such type using pulse compression techniques to achieve a high degree of resistance against unauthorized interception and interference.

Pulse compression systems, for example pulse compression radar systems, are well-known in the art. One example of a pulse compression radar is described in U.S. Pat. No. 2,624,876, issued to R. H. Dicke on Jan. 6, 1953. According to said patent a relatively long duration, low amplitude frequency swept pulse is transmitted toward a reflecting object. The reflected signal received from said object is processed in a specially designed filter network located in the radar receiver. The network is characterized by a signal time delay vs. frequency transfer function complementary to the time order of occurrences of the different frequency components of the transmitted signal. As a result, the relatively long time duration, low amplitude signal received from the reflecting object is converted into a relatively short time duration, high amplitude compressed pulse.

The pulse compressing technique permits increased target range discrimination at greater target ranges without exceeding transmitted power peak limitations. Another recognized advantage attributable to pulse compression is the substantial degree of discrimination that is achieved against signals other than the one to which the filter characteristics are matched. Although the amplitudes of desired signals are increased in passing through the compression filter, undesired signals (those having modulations other than that to which the filter is matched) suffer suppression as a result of the compression filter action.

A principal object of the present invention is to exploit the inherent signal discrimination advantages of pulse compression techniques in a pulse data communication system.

Another object is to provide a secure system for conveying data in accordance with the number of and spacing between a succession of pulses.

A further object is to provide a pulse data communication system wherein simultaneous messages may be conveyed within the same frequency spectrum without mutual interference.

Another object is to provide a pulse compression coding system for the communication of data by a complex angle modulated carrier signal to yield a succession of pulses wherein the number of pulses is determined by the carrier modulation index and the spacing between the pulses is determined by the carrier modulation rate.

These and other objects of the present invention, as will appear from a reading of the following specification, are achieved in a typical embodiment by the provision of means for angle modulating (phase or frequency modulating) a linearly frequency swept carrier signal by a sinusoidal signal of selectable amplitude and frequency. The angle modulated carrier signal is processed, upon reception, through a conventional linear pulse compression filter to yield a succession of pulses. The number of pulses in the pulse train is determined by the amplitude of the sinusoidal modulating signal. The spacings between the pulses comprising the pulse train is determined by the frequency of said sinusoidal signal.

Provision is also made for the simultaneous transmission of two angle modulated linearly frequency swept carrier signals within the same frequency spectrum. One of the modulated carrier signals is frequency swept in a sense opposite to the sense in which the other modulated carrier signal is frequency swept. Each linearly frequency swept carrier signal, in turn, may be independently angle modulated by separate sinusoidal modulating signals. The transmitted signals are simultaneously processed in parallel receiver channels which include pulse compression filters of substantially identical design. The received signals are coupled to the pulse compression filters by respective signal heterodyning means which reduce the carrier frequency of the received signals to a conveniently lower value to which the compression filters are designed. One of the heterodyning means also inverts the sense of the frequency sweeps of both received signals. The other heterodyning means preserves the sense of the frequency sweeps of the received signals. The result is that each compression filter responds substantially only to a respective one of the received carrier signals to the exclusion of the other whereby the message data conveyed by the individual transmitted signals may be separately detected without mutual interference.

In another embodiment of the invention, the outputs of the receiver heterodyning circuits are combined and then applied to a single pulse compression filter. Provision is made for delaying the signal output from one of the heterodyning circuits, relative to the output of the other heterodyning circuit, before applying the signals to the pulse compression filter. This arrangement substantially increases the flexibility and capacity of the resulting pulse code, i.e., the number of pulses produced at the output of the compression filter and the spacing possibilities between the individual pulses are increased.

For a more complete understanding of the present invention, reference should be had to the following specification and to the figures of which:

As is understood in the pulse compression art, a frequency swept carrier signal of relatively low amplitude and long duration may be compressed into a predominant single pulse of relatively high amplitude and short duration by a pulse compression filter. It also is known that when a carrier wave is phase or frequency modulated in sinusoidal fashion, the resulting modulated signal contains frequency components analogous to the carrier frequency and sideband components of an amplitude modulated wave. The frequencies of the resulting sideband components are related to each other by integral multiples of the modulation rate. Thus, the first order sidebands of the phase or frequency modulated signal correspond to the sidebands of an amplitude modulated signal. Unlike the amplitude modulated signal, the phase or frequency modulated signal also includes higher order sideband components having amplitudes which increase with increases in the modulation index.

In accordance with the present invention, a carrier signal is simultaneously angle modulated by a linearly changing sawtooth signal and a sinusoidal signal. The result is a linearly frequency swept carrier signal having replica linearly frequency swept sideband components frequency separated from the carrier by integral multiples of the sinusoidal signal frequency. The frequency separations between the different sideband components of the modulated signal, when acted upon by a pulse compression filter, are converted into correspondingly different time delays. Each sideband component produces a respective predominant single pulse at the output of the pulse compression filter at a time corresponding to the frequency of the sideband component. The frequency of each sideband component, relative to the carrier, is dependent upon the frequency of the sinusoidal modulating signal. Thus, the separations between the pulses appearing at the output of the pulse compression filter may be varied by changing the frequency of the sinusoidal modulating signal.

The energy levels of the individual sideband components, on the other hand, are determined by the modulation index, i.e., by the amplitude of the sinusoidal modulating signal. In particular, changes in the modulation index give rise to different energy distributions between the sideband components. Depending upon the modulation index, the carrier and/or preselected sideband components may be reduced to energy levels producing no significant response in the pulse compression filter. Thus, the number of pulses produced at the output of the compression filter may be varied by changing the modulation index.

Figure 1:
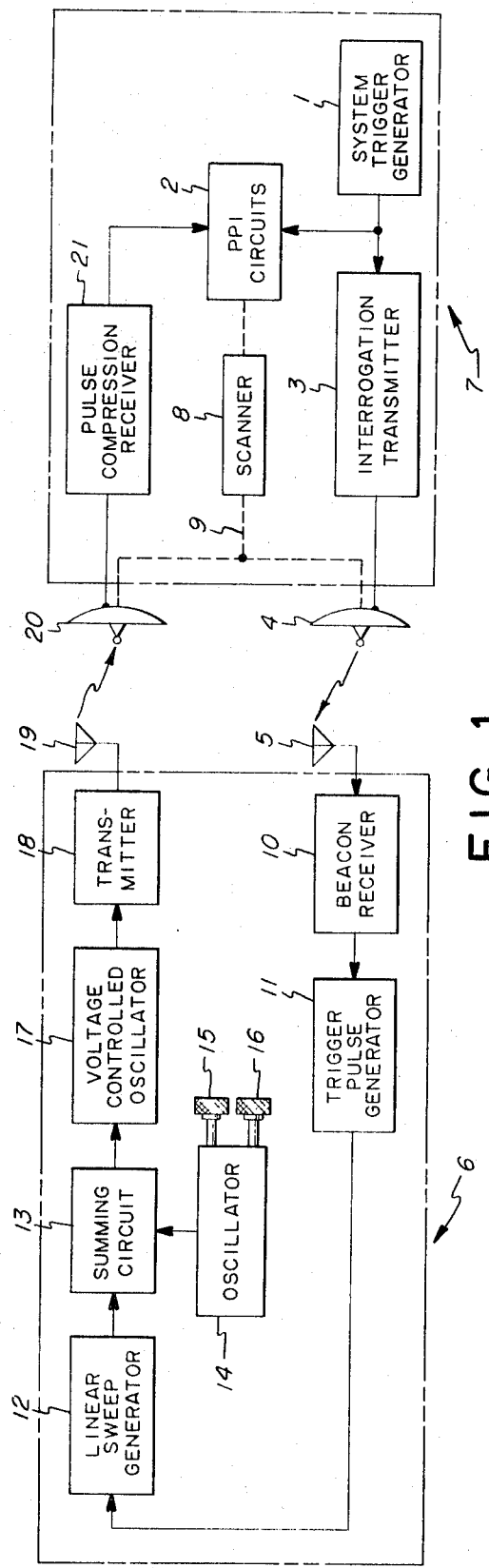
FIG. 1 is a simplified block diagram of an interrogator-beacon embodiment of the present invention.
Figure 2:
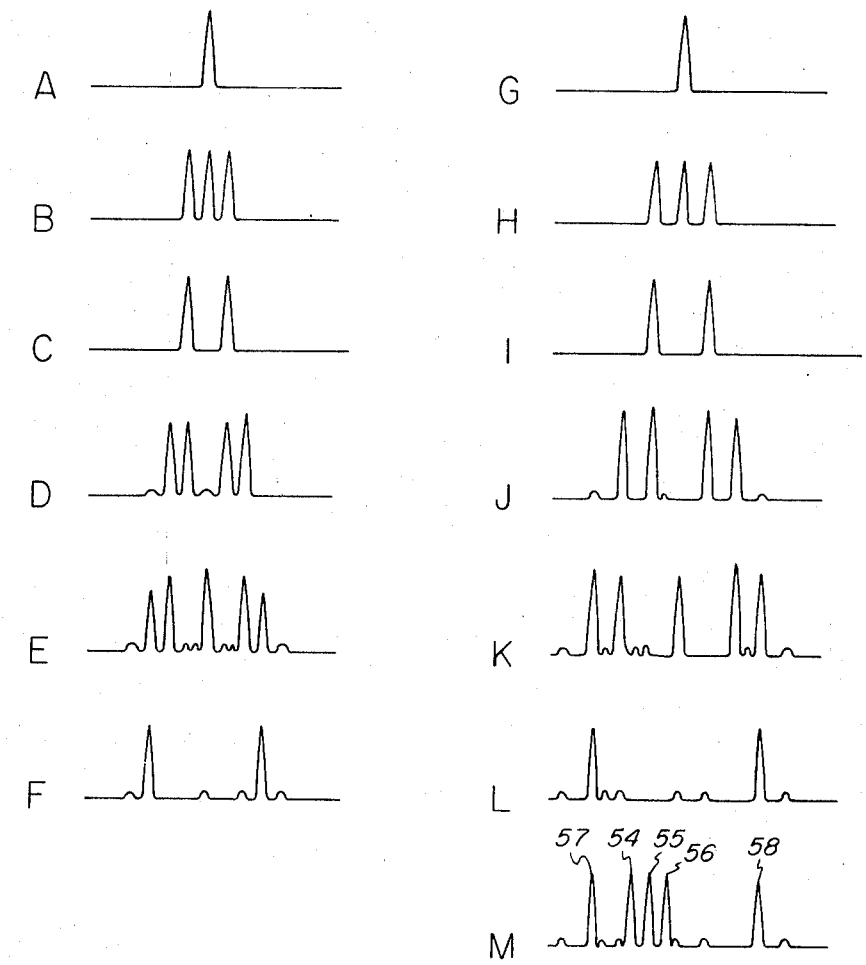
FIG. 2 is a series of waveforms produced in the embodiment of FIG. 1 under various operating conditions.

The above-described phenomena may be better understood by reference to the embodiment of FIG. 1 and to the waveforms of FIG. 2. The interrogator-beacon identification system represented in FIG. 1 is a typical application wherein the present invention beneficially may be employed. The overall system repetition rate is established by the recurring pulses produced by system trigger generator 1 of interrogator 7. The pulses are applied to plan position indicator circuits 2 to synchronize the PPI radial deflection in a conventional manner; they are also applied to actuate interrogator transmitter 3. Transmitter 3 produces pulses of microwave energy which are radiated via antenna 4 toward receiving antenna 5 of beacon apparatus 6. Antenna 4 of interrogator 7 is continuously scanned in azimuth synchronously with the angular rotation of the PPI presentation by means of scanner 8 and linkage 9.

The pulses received by antenna 5 are detected within beacon receiver 10 and actuate trigger pulse generator 11 to produce trigger pulses which are applied to linear sweep generator 12. Generator 12 produces a substantially linear sawtooth waveform in response to each pulse received by antenna 5. The sawtooth waveform is applied to a first input of summing circuit 13 which also receives a sinusoidal signal generated by oscillator 14. Oscillator 14 is adapted in a conventional manner to produce a sinusoidal signal of controllable amplitude and frequency in accordance with the settings of amplitude control knob 15 and frequency control knob 16.

A composite waveform which is the amplitude summation of the sawtooth and sinusoidal signals is produced at the output of summing circuit 13 and applied to voltage controlled oscillator circuit 17. Oscillator 17 may comprise an ordinary reactance tube and oscillator circuit wherein the frequency of the oscillator is determined by the amplitude of the composite signal waveform which is derived from summing circuit 13 and applied to the reactance tube. The complex angle modulated carrier signal at the output of oscillator 17 is applied to the usual components represented by transmitter 18 and is radiated via antenna 19 toward receiving antenna 20 of interrogator 7. The modulated signal received by antenna 20 is processed through pulse compression receiver 21 and applied as a beacon identification signal to the cathode ray tube associated with PPI 2.

Pulse compression receiver 21 includes a conventional linear pulse compression filter, i.e., a filter having a linear signal time delay vs. frequency characteristic. Assuming, for example, that the sense of the frequency sweep of the signal transmitted by interrogator 6 is such that the carrier frequency increases with time, the receiver compression filter is arranged to delay higher frequency components by amounts less than the time delay introduced into lower frequency components. It will be recognized, of course, that the sense of the frequency sweep of the interrogator signal may be inverted with the lower frequency components of the transmitted signal occurring later than the higher frequency component. In the latter case, it is only necessary to arrange the receiver to have a complementary time delay vs. frequency characteristic with lower frequency components being delayed by amounts less than the higher frequency components to produce the desired compressed pulses in the receiver. It should be noted that a single compressed predominant pulse is produced at the output of pulse compression receiver 21 in response to each received frequency swept signal only in the event that there is substantially no sinusoidal angular modulation. That is, that the single pulse is produced in the absence of any appreciable amplitude output from oscillator 14 and in the presence of a sawtooth output from generator 12.

As previously discussed, the sinusoidal phase modulation of the carrier wave produces a modulated carrier signal and carrier sideband components which are frequency displaced from the carrier by integral multiples of the modulation rate. The amplitudes of the sideband components vary directly with the modulation index. Therefore, as the amplitude of the sinusoidal signal of oscillator 14 is increased by adjustment of amplitude control 15, the higher sideband components of the angle modulated signal transmitted by interrogator 6 assume significant levels. Each sideband component of significant level is time displaced, upon being processed through pulse compression receiver 21, into a respective predominant compressed pulse. The time separation between the compressed pulses at the output of pulse compression receiver 21 is determined by the frequency separation between the respective sideband components of the incident modulated carrier signal.

The waveforms of FIG. 2 depict various pulse outputs from pulse compression receiver 21 resulting from the same frequency setting but different amplitude settings of sinusoidal oscillator 14 of beacon 6. For example, in the case of waveform A, the amplitude of the sinusoidal signal is at a negligible value whereby the frequency of oscillator 17 is controlled by substantially only the linear sawtooth produced by generator 12. Accordingly, waveform A depicts a single predominant compressed pulse which is produced at the output of a linear pulse compression filter in the well known manner in response to a linearly frequency swept input carrier signal. As the amplitude of the sinusoidal signal is increased to a significant value, a portion of the carrier signal energy of the modulated signal is transferred to the first order sideband components which are equally frequency displaced from the carrier by an amount determined by the modulation rate, i.e., by an amount determined by the frequency of the sinusoidal signal produced by oscillator 14.

The first order sideband components are time displaced equally and oppositely about the carrier by the action of pulse compression receiver 21 to produce the three time displaced compressed pulses represented by waveform B. Upon increasing the amplitude of the sinusoidal signal still further, substantially all of the energy of the carrier component is directed into the first order sideband components whereby the time displaced pulse pair of waveform C appears at the output of the compression filter. In the event of additional amplitude increases in the sinusoidal signal, the pulse patterns depicted in waveforms D, E and F successively appear at the output of pulse compression receiver 21. Waveform D shows that substantially all of the carrier energy has been transferred into the first and second order sideband components; waveform E indicates that the total angle modulated signal energy has been apportioned between the carrier component, the second order sideband components and the third order sideband components; waveform F shows that substantially all of the modulated signal energy has been directed into the third order sideband components. The changes in the energy distributions between the carrier and sideband components of an angle modulated signal as a function of the modulation index are shown in the graphs appearing on page 579 of "Radio Engineers Handbook" by Frederick Termans, McGraw-Hill 1943; waveforms A–F of FIG. 2 which were observed in an operating system utilizing the carrier modulation and pulse compression components represented in the embodiment of FIG. 1 are in full agreement therewith.

Waveforms G–L of FIG. 2 where produced in a manner similar to the manner of waveforms A–F excepting that the frequency of the sinusoidal modulating signal (the signal produced by oscillator 14 of beacon 6) was increased over the frequency utilized in the generation of waveforms A–F. As predicted by the Bessel functions which describe a sinusoidally angle modulated wave, an increase of frequency in the sinusoidal modulating signal increases the frequency separation between the sideband components. Increased frequency separation between the sideband components, in turn, produces increased separation between the compressed pulses produced at the output of pulse compression receiver 21 inasmuch as frequency differentials are converted into time (phase shift) differentials therein. This phenomenon is clearly depicted in waveforms G-L of FIG. 2 wherein the separations between the pulses are increased relative to the separations between the corresponding pulses of waveforms A-F.

It will be recognized that waveforms A-F may be interpreted as a pulse code having an alphabet of six "characters." The "characters" are distinct from each other in two respects, namely, in terms of number of pulses (except for waveforms C and F) and in terms of the spacings between pulses. The number of pulses may be varied by adjusting the setting of amplitude control 15 of oscillator 14 whereas the spacings between the pulses may be varied by adjusting the setting of frequency control 16 of oscillator 14.

Returning to FIG. 1, the coded waveforms depicted in FIG. 2 may be employed in distinguishing the sources of the signal returns displayed on PPI 2. For example, if the beacon apparatus 6 is carried on board an aircraft, a series of radially displaced markers (corresponding to the time displaced pulses of FIG. 2) will be displayed on PPI 2 of interrogator 7 at the location generally representing aircraft range and bearing. In addition, the specific pattern (number and spacing) of the radially displaced markers identifies a particular aircraft as against other aircraft that also may be transmitting responses to interrogator 7. Each aircraft can be assigned a respective code character in terms of the amplitude setting and frequency setting of the sinusoidal oscillator 14 which is required to produce the display representing the assigned character on PPI 2.

An important feature of the present invention is that two independently coded sets of signal data may be transmitted simultaneously within the same frequency spectrum without mutual interference. For example, a first angle modulated carrier signal producing waveform B of FIG. 2 at the output of the pulse compression receiver may be transmitted simultaneously with an angle modulated signal producing waveform F at the output of the same pulse compression receiver. Any other combination of the characters depicted in FIG. 2 may be simultaneously transmitted. The embodiment represented in FIG. 3 is adapted to achieve such a result.

Figure 3:
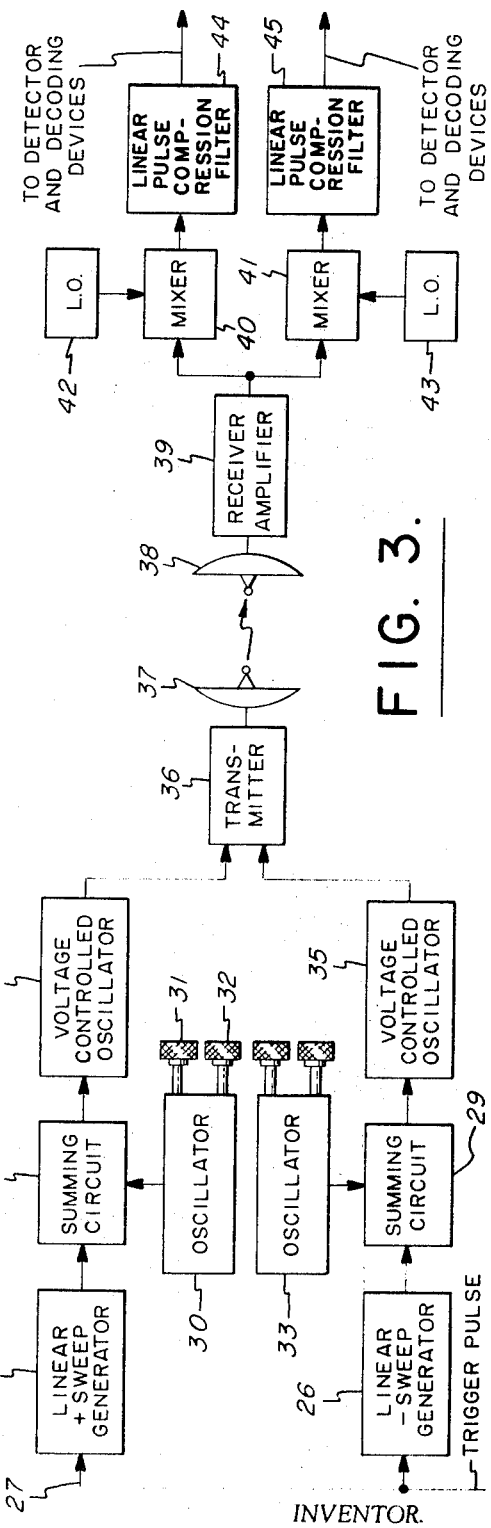
FIG. 3 is a simplified block diagram of a typical embodiment suitable for the simultaneous transmission of independent data using the same frequency spectrum without mutual interference between the data.

Referring to FIG. 3, linear sweep generators 25 and 26 are actuated simultaneously by a triggering pulse applied by line 27. The triggering pulses may be derived from a remote transmitter such as interrogator 7 in the embodiment of FIG. 1. Alternatively, the triggering pulses may be generated locally and entirely apart from any interrogator-beacon system which is only one of many possible uses of the present invention. In the case of a telemetering system, for example, a trigger pulse is produced on line 27 each time that it is desired to simultaneously transmit two independent sets of data to a remote receiver location.

Sweep generators 25 and 26 may be conventional in design using similar but not identical circuits. Generator 25 differs from generator 26 in that the linear sweep produced by generator 25 increases linearly with respect to time whereas the sweep produced by generator 26 decreased linearly with respect to time as denoted by the legends "+ sweep" and "− sweep," respectively. The sawtooth waveforms from generators 25 and 26 are applied to respective summing circuits 28 and 29. Circuit 28, like circuit 13 of FIG. 1, also receives a sinusoidal signal of adjustable amplitude and frequency. The sinusoidal signal is produced by oscillator 30 which is provided with an amplitude control knob 31 and a frequency control knob 32. Similarly, a sinusoidal signal of controllable amplitude and frequency is generated by oscillator 33 and applied to summing circuit 29. A composite modulating signal which is the amplitude summation of the sawtooth produced by generator 25 and the sinusoidal wave generated by oscillator 30 is applied to oscillator 34 to control the frequency thereof in the manner described in connection with FIG. 1. A composite modulating signal comprising the sawtooth from generator 26 and the sinusoidal signal from oscillator 33 is applied to voltage controlled oscillator 35. The angle modulated frequency swept carrier signals from oscillator 34 and 35 are applied to transmitter 36 and radiated via antenna 37 towards antenna 38 of a remote data receiver. It is desirable that transmitter 36 consists of linear circuits so that cross-modulation between the two simultaneous oscillator signals is avoided.

The angle modulated swept carrier signals are coterminus in time and coextensive in frequency spectrum, thus occupying simultaneously the same communication channel. The two signals are separated from each other and detected without mutual interference by the action of the components now to be described. Both of the angle modulated signals are amplified within receiver-amplifier 39 and applied jointly to mixers 40 and 41. Mixers 40 and 41 are provided with respective local oscillators 42 and 43. In addition to converting the frequencies of the received signals to values at which pulse compression filters 44 and 45 may be conveniently designed, one of the mixers is adapted to invert the sweep sense of the two received signals which are applied to it. The inversion of the sense of the frequency sweeping may be accomplished by setting the frequency of local oscillator 42, for example, above the band of frequencies in which the two frequency swept signals lie and by selecting the lower sideband which is produced as a result of the heterodyning action with mixer 40. The sense of the frequency sweeping of the received signals may be preserved by using a local oscillator frequency lower than the band of received frequencies and/or by utilizing the higher sideband produced by the mixer. This technique is disclosed in greater detail in copending U.S. Pat. application Ser. No. 546,599 now U.S. Pat. No. 3,400,396 filed Nov. 14, 1955, in the names of Charles E. Cook and Charles E. Brockner for Pulse Stretching and Compression Radar System. In an illustrative case, mixer 40 and local oscillator 42 are arranged to invert the frequency sweep of the two received signals whereas mixer 41 and local oscillator 43 preserve the sense of the frequency sweep of the same two signals which are applied to it.

It will be recalled that the two transmitted signals are swept in frequency in senses opposite to each other. Therefore, when mixer 40 inverts the frequency sweep of both received signals, the two signals applied to pulse compression filter 44 still are oppositely swept with respect to each other. The same is true of the two signals which are applied to pulse compression filter 45 although no sweep inversion is effected within mixer 41.

Pulse compression filters 44 and 45 preferably are of substantially identical design. Each will compress or enhance a modulated signal which is frequency swept in a predetermined sense and will suppress or attenuate a modulated signal which is frequency swept in a sense opposite to said predetermined sense. To clarify the compression and suppression action, let it be assumed that a signal A is produced by oscillator 34 and that a signal B is produced by oscillator 35. It is further assumed that signal A is swept from a lower frequency to a higher frequency value suitable for compression within a filter following the design of filters 44 and 45 whereas signal B is frequency swept from a higher to a lower frequency value that is suppressed within the same filter. Signals A and B are transmitted, received and then applied to mixers 40 and 41. Inasmuch as mixer 41 does not invert the sense of frequency sweep of either received signal, only signal A is compressed within filter 45 and appears at the output thereof, signal B being suppressed and discriminated against. Mixer 40, on the other hand, inverts the sense of the frequency sweep of both signals A and B so that only signal B is compressed and appears at the output of filter 44 whereas signal A does not. Each of signals A and B at the output of filters 45 and 44 respectively, may comprise any of the compressed pulse waveforms depicted in FIG. 2 depending upon the amplitude and frequency setting of the respective sinusoidal oscillators 30 and 33. Thus, the signals A and B may be separately encoded and separately decoded without mutual interference despite the fact that the two signals occupy substantially the same frequency spectrum at the same time.

It will be recognized by inspection of the waveforms of FIG. 2 that the "alphabet" of the coded signals of the present invention is limited to a relatively small number of distinguishable characters. Although the number of distinguishable characters is sufficient for certain applications wherein it is required to transmit only restricted amounts of data, it may be desirable in other instances to provide an alphabet of greater data representing capacity. An increased alphabet of coded characters may be achieved through the use of the embodiment represented in FIG. 4.

Figure 4:
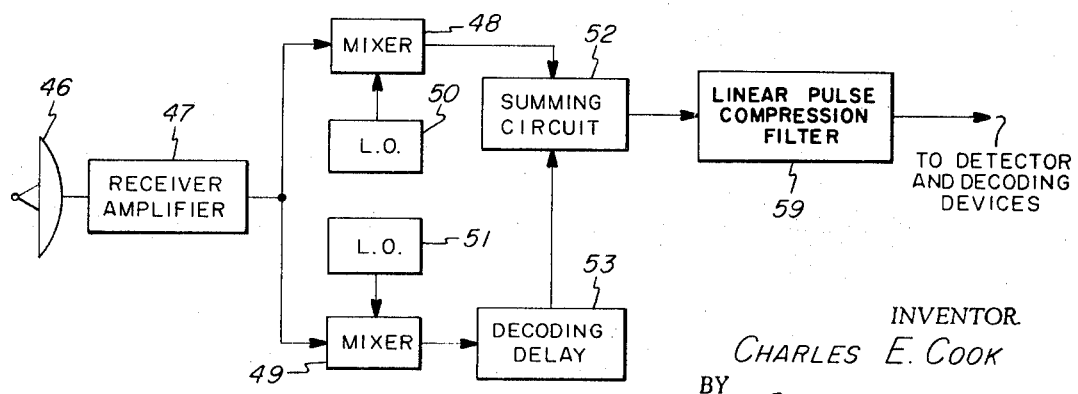
FIG. 4 is a simplified block diagram of an embodiment alternative to FIG. 3 for yielding a pulse code of greater flexibility and capacity.

The receiving apparatus depicted in FIG. 4 may be used in conjunction with transmitting apparatus identical to that which is represented in FIG. 3. The substantial difference between the embodiments represented in FIGS. 3 and 4 lies in the manner in which the oppositely frequency swept received carrier signals are processed for pulse compression. The receiver of FIG. 4 is equipped with antenna 46, receiver-amplifier 47, mixers 48 and 49, and local oscillators 50 and 51 corresponding in structure and function to antenna 38, receiver-amplifier 39, mixers 40 and 41 and local oscillators 42 and 43 of FIG. 3. As in the case of FIG. 3, mixer 48 and local oscillator 50 invert the sense of the frequency sweep of the two received angle modulated carrier signals whereas mixer 49 and local oscillator 51 preserve said sense. The output signals from mixer 48 are applied to a first input of summing circuit 52. The output signals from mixer 49 are applied to the other input of summing circuit 52 via decoding delay 53. The signals at the output of summing circuit 52, in turn, are processed in pulse compression filter 59.

The purpose of decoding delay 53 will be seen by reference to the waveforms of FIG. 2. Waveform M represents a typical composite code character that may be produced with the aid of the receiver equipment of FIG. 4. It will be observed that illustrative waveform M results from the superposition or interleaving of waveforms B and L. The three pulses 54, 55 and 56 are attributable to waveform B; pulses 57 and 58 are attributable to waveform L. The position of the pulses 54, 55 and 56 relative to the position of pulses 57 and 58 is determined by the setting of decoding delay 53. Thus, the time separation between pulses 57 and 54 are between pulses 56 and 58 is determined by delay 53. The spacing between pulses 57 and 58 and between each of the pulses 54, 55 and 56 is established by the frequencies of the sinusoidal oscillators at the data transmitter as previously described. Not only is the code alphabet enlarged by the synthesis of new code characters comprising combinations of the individual code characters of FIG. 2 but the positions of the constituent characters comprising a composite character may be varied by changing the value of the time delay indicated by decoding delay 53.

It should be observed that delay 53 effectively delays only code constituent 54, 55, 56 despite the fact that signals representing both code constituent 54, 55, 56 and code constituent 57, 58 pass through that circuit element. Such selective delay action is achieved by virtue of the fact that the signals representing the two code constituents are swept in frequency in a sense opposite to each other.

Let it be assumed that code constituent 54, 55, 56 is produced by the received frequency swept signal which is not inverted in mixer 49 but is compressed in pulse compression filter 59. Therefore, the received signal representing code constituent 57, 58 is of an opposite frequency sense which is neither sense-inverted in mixer 49 nor compressed in pulse compression filter 59. The result is that the decoding delay 53 produces an observable delay effect at the output of pulse compression filter 59 only with respect to constituents 54, 55, 56.

Inasmuch as both of the two received frequency swept signals are sense-inverted in mixer 48, only the signal representing code constituent 57, 58 is compressed by pulse compression filter 59. The signal representing code constituent code 54, 55, 56 at the output of mixer 48 is of the wrong frequency sweep sense for compression within filter 59 and for that reason is suppressed. One may consider for practical purposes that constituent 57, 58 appears solely at the output of mixer 48 whereas constituent 54, 55, 56 appears solely at the output of mixer 49 whereby the coding delay 53 affects only constituent 54, 55, 56 and not both constituents.

In the embodiments of FIGS. 3 and 4 where two oppositely swept angle modulated carrier signals are transmitted simultaneously, it is preferred that the circuits included within transmitter 36 be substantially linear in operation in order to avoid cross-modulation effects between the oppositely swept signals. On the other hand, it may be desirable in certain instances that the power amplifiers included within transmitter 36 be operated other than class A to increase transmitter efficiency. In such cases it is preferred that the two oppositely swept angle modulated signals be transmitted sequentially rather than simultaneously to avoid the aforementioned cross-modulation. It then would be necessary to insert a delay in the receiver mixer channel through which only the earlier transmitted signal effectively passes so that the two frequency swept signals are restored to time coincidence at the input of the receiver pulse compression filter. The amount of the delay, of course, would be determined by the time interval intervening the transmission of the respective frequency swept signals.

Although active frequency modulating circuits have been utilized in the disclosed transmitter embodiments, i.e., the angle modulated frequency swept carrier signals are generated with the use of voltage controlled oscillators, the present invention may be practiced with the use of passive angle modulation means including the use of a pulse expansion filter network as described in copending patent application Ser. No. 251,937 now U.S. Pat. No. 3,281,842 filed Jan. 16, 1963 in the names of Charles E. Cook and Joseph F. Cerar for "Electronic Means for Suppressing Range Side Lobes of a Compressed Pulse Signal." In particular, a frequency swept pulse is produced by applying a pulsed oscillatory signal to a pulse expansion filter network. The frequency swept pulse at the output of the expansion network then is amplitude modulated by a sinusoidal signal of controllable amplitude and frequency. The amplitude modulated frequency swept signal is applied to a hard limiter wherein the amplitude modulation components are converted to phase modulation components to achieve substantially the same complex angle modulated signal which is produced at the output of the voltage controlled oscillators utilized in the embodiments of FIGS. 1, 3 and 4.

While the invention has been described in its preferred embodiments, it is understood that the words which have been used are words of description rather than of limitation and that changes within the purview of the appended claims may be made without departing from the true scope and spirit of the invention in its holder aspects.

What is claimed is:

1. A pulse compression coding system comprising a transmitter and a receiver;

said transmitter comprising a source of first frequency swept carrier oscillations, a source of second frequency swept carrier oscillations, the sense of the carrier frequency sweep of said second oscillations being opposite to the sense of the carrier frequency sweep of said first oscillations, a source of first sinusoidal modulating signal, a source of second sinusoidal modulating signal, first means for angle modulating said first oscillations with said first sinusoidal signal, second means for angle modulating said second oscillations with said second sinusoidal signal, means for transmitting the angle modulated first and second carrier oscillations;

said receiver comprising means for receiving the transmitted carrier oscillations, means for inverting the frequency sweep sense of both received carrier oscillations, and pulse compression filter means, the received carrier oscillations and the sense-inverted carrier oscillations being applied to said pulse compression filter means.

2. A pulse compression coding system comprising a transmitter and a receiver;

said transmitter comprising a source of first frequency swept carrier oscillations, a source of second frequency swept carrier oscillations, the sense of the carrier frequency sweep of said second oscillations being opposite to the sense of the carrier frequency sweep of said first oscillations, a source of first sinusoidal modulating signal of controllable amplitude and frequency, a source of second sinusoidal modulating signal of controllable amplitude and frequency, first means for angle modulating said first oscillations with said first sinusoidal signal, second means for angle modulating said second oscillations with said second sinusoidal signal, linear means for simultaneously transmitting the angle modulated first and second carrier oscillations;

said receiver comprising means for receiving the transmitted carrier oscillations, means for inverting the frequency sweep sense of both received carrier oscillations, and pulse compression filter means, the received carrier oscillations and the sense-inverted carrier oscillations being applied to said pulse compression filter means.

3. A pulse compression coding system comprising a transmitter and a receiver;

said transmitter comprising a source of first linearly frequency swept carrier oscillations, a source of second linearly frequency swept carrier oscillations, the sense of the carrier frequency sweep of said second oscillations being opposite to the sense of the carrier frequency sweep of said first oscillations, a source of first sinusoidal modulating signal of controllable amplitude and frequency, a source of second sinusoidal modulating signal of controllable amplitude and frequency, first means for angle modulating said first oscillations with said first sinusoidal signal, second means for angle modulating said second oscillations with said second sinusoidal signal, linear means for simultaneously transmitting the angle modulated first and second carrier oscillations;

said receiver comprising means for receiving the transmitted carrier oscillations, means for inverting the frequency sweep sense of both received carrier oscillations, and pulse compression filter means having a linear signal time delay versus frequency characteristic whereby received signal components are delayed by amounts linearly related to the frequencies thereof, the received carrier oscillations and the sense-inverted carrier oscillations being applied to said pulse compression filter means.

4. Transmitting means comprising a source of first frequency swept carrier oscillations, a source of second frequency swept carrier oscillations, the sense of the carrier frequency sweep of said second oscillations being opposite to the sense of the carrier frequency sweep of said first oscillations, a source of first sinusoidal modulating signal, a source of second sinusoidal modulating signal, first means for angle modulating said first oscillations with said first sinusoidal signal, second means for angle modulating said second oscillations with said second sinusoidal signal, and means for transmitting the angle modulated first and second carrier oscillations.

5. Transmitting means comprising a source of first frequency swept carrier oscillations, a source of second frequency swept carrier oscillations, the sense of carrier frequency sweep of said second oscillations being opposite to the sense of the carrier frequency sweep of said first oscillations, a source of first sinusoidal modulating signal of controllable amplitude and frequency, a source of second sinusoidal modulating signal of controllable amplitude and frequency, first means for angle modulating said first oscillations with said first sinusoidal signal, second means for angle modulating said second oscillations with said second sinusoidal signal, and linear means for simultaneously transmitting the angle modulated first and second carrier oscillations.

6. Receiving means comprising means for receiving first and second angle modulated frequency swept carrier oscillations, the sense of the carrier frequency sweep of said second oscillations being opposite to the sense of the carrier frequency sweep of said first oscillations, means for inverting the frequency sweep sense of both received carrier oscillations, and pulse compression filter means, the received carrier oscillations and the sense-inverted carrier oscillations being applied to said pulse compression filter means.

7. Receiving means comprising means for receiving first and second angle modulated linearly frequency swept carrier oscillations, the sense of the carrier frequency sweep of said second oscillations being opposite to the sense of the carrier frequency sweep of said first oscillations, means for inverting the frequency sweep sense of both received carrier oscillations, and pulse compression filter means having a linear signal time delay versus frequency characteristic whereby received components are delayed by amounts linearly related to the frequencies thereof, the received carrier oscillations and the sense-inverted carrier oscillations being applied said pulse compression filter means.

8. Receiving means comprising means for receiving first and second angle modulated frequency swept carrier oscillations, the sense of the carrier frequency sweep of said second oscillations being opposite to the sense of the carrier frequency sweep of said first oscillations, means for inverting the frequency sweep sense of both received carrier oscillations, a first pulse compression filter, and a second pulse compression filter having substantially the same frequency versus delay characteristic as that of said first filter, the received carrier oscillations being applied to said first filter and the sense-inverted carrier oscillations being applied to said second filter.

9. Receiving means comprising means for receiving first and second angle modulated frequency swept carrier oscillations, the sense of the carrier frequency sweep of said second oscillations being opposite to the sense of the carrier frequency sweep of said first oscillations, means for inverting the frequency sense of both received carrier oscillations, means for additively combining the received oscillations and the sense-inverted oscillations, and a pulse compression filter, the combined oscillations being applied to said pulse compression filter.

10. Receiving means comprising means for receiving first and second angle modulated frequency swept carrier oscillations, the sense of the carrier frequency sweep of said second oscillations being opposite to the carrier frequency sweep of said first oscillations, means for inverting the frequency sweep sense of both received carrier oscillations, a signal summing circuit, means for applying the received carrier oscillations and the sense-inverted carrier oscillations to said summing circuit, said means for applying including signal delay means for delaying one of the received oscillations and the sense-inverted oscillations relative to the other, and a pulse compression filter, the output of said summing circuit being connected to the input of said pulse compression filter.

11. A pulse compression coding system comprising a transmitter and a receiver;

said transmitter comprising a source of first frequency swept carrier oscillations, a source of second frequency swept carrier oscillations, the sense of the carrier frequency sweep of said second oscillations being opposite to the sense of the carrier frequency sweep of said first oscillations, a source of first sinusoidal modulating signal, a source of second sinusoidal modulating signal, first means for angle modulating said first oscillations with said first sinusoidal signal, second means for angle modulating said second oscillations with said second sinusoidal signal, means for transmitting the angle modulated first and second carrier oscillations, said receiver comprising means for receiving the transmitted carrier oscillations, means for inverting the frequency sweep sense of both received carrier oscillations, a first pulse compression filter, and a second pulse compression filter having substantially the same frequency versus delay characteristic as that of said first signal, the received carrier oscillations being applied to said first filter and the sense-inverted carrier oscillations being applied to said second filter.

12. A pulse compression coding system comprising a transmitter and a receiver;

said transmitter comprising a source of first frequency swept carrier oscillations, a source of second frequency swept carrier oscillations, the sense of the carrier frequency sweep of said second oscillations being opposite to the sense of the carrier frequency sweep of said first oscillations, a source of first sinusoidal modulating signal, a source of second sinusoidal modulating signal, first means for angle modulating said first oscillations with said first sinusoidal signal, second means for angle modulating said second oscillations with said second sinusoidal signal, means for transmitting the angle modulated first and second carrier oscillations, said receiver comprising means for receiving the transmitted carrier oscillations, means for inverting the frequency sweep sense of both received carrier oscillations, a signal summing circuit, means for applying the received carrier oscillations and the sense-inverted carrier oscillations to said summing circuit, said means for applying including signal delay means for delaying one of said received oscillations and said sense-inverted oscillations relative to the other, and a pulse compression filter, the output of said summing circuit being connected to the input of said pulse compression filter.

13. A pulse compression coding system comprising a transmitter and a receiver;

said transmitter comprising a source of first frequency swept carrier oscillations, a source of second frequency swept carrier oscillations, the sense of the carrier frequency sweep of said second oscillations being opposite to the sense of the carrier frequency sweep of said first oscillations, a source of first sinusoidal modulating signal, a source of second sinusoidal modulating signal, first means for angle modulating said first oscillations with said first sinusoidal signal, second means for angle modulating said second oscillations with said second sinusoidal signal, linear means for simultaneously transmitting the angle modulated first and second carrier oscillations, said receiver comprising means for receiving the transmitted carrier oscillations, means for inverting the frequency sweep sense of both received carrier oscillations, and pulse compression filter means, the received carrier oscillations and the sense-inverted carrier oscillations being applied to said pulse compression filter means.

* * * * *